(12) United States Patent
Hanson et al.

(10) Patent No.: US 9,380,265 B2
(45) Date of Patent: Jun. 28, 2016

(54) CALL INDICATOR TOOL

(71) Applicant: BANK OF AMERICA CORPORATION, Charlotte, NC (US)

(72) Inventors: Carrie Anne Hanson, Charlotte, NC (US); Alicia C. Jones-McFadden, Fort Mill, SC (US); Craig Sobol, Waxhaw, NC (US); Brent Alan Shelkey, Huntersville, NC (US); Kimberly Ya-chin Chang, Houston, TX (US); Sarah Beth Gottfried, Westlake, OH (US); Wang Liang, Pasadena, CA (US); Neha Rani Rathi, Reston, VA (US); Anthony Scott Wong, Union, KY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 14/530,137

(22) Filed: Oct. 31, 2014

(65) Prior Publication Data

US 2016/0127684 A1 May 5, 2016

(51) Int. Cl.
*H04N 7/14* (2006.01)
*H04N 7/15* (2006.01)
*G06F 3/0484* (2013.01)

(52) U.S. Cl.
CPC ............... *H04N 7/15* (2013.01); *G06F 3/04842* (2013.01)

(58) Field of Classification Search
CPC .................................. H04N 7/15; H04N 7/147
USPC .......... 348/14.07, 14.08, 14.09, 14.01, 14.05, 348/211.12, 14.12, 14.1, 569; 379/93.21, 379/158, 202.01, 205.01, 263
See application file for complete search history.

(56) References Cited

U.S. PATENT DOCUMENTS

| | | | |
|---|---|---|---|
| 7,848,984 B1 | 12/2010 | Robb | |
| 7,890,405 B1 | 2/2011 | Robb | |
| 8,195,555 B2 | 6/2012 | Robb | |
| 8,374,944 B2 | 2/2013 | Robb | |
| 8,539,354 B2 | 9/2013 | Beswick et al. | |
| 8,571,195 B2 * | 10/2013 | Pasi ...................... | H04M 3/523 379/205.01 |
| 8,731,180 B2 | 5/2014 | Benefield et al. | |
| 2011/0289427 A1* | 11/2011 | Toprani ................. | G06F 3/0488 715/746 |
| 2011/0320958 A1* | 12/2011 | Kashi ................. | G06Q 10/1095 715/751 |
| 2013/0151301 A1 | 6/2013 | Robb | |
| 2014/0143141 A1 | 5/2014 | Kumar | |

\* cited by examiner

*Primary Examiner* — Yosef K Laekemariam
(74) *Attorney, Agent, or Firm* — Michael A. Springs; Moore & Van Allen PLLC; Anup Shrinivasan

(57) ABSTRACT

Embodiments of the invention detail systems, computer program products, and methods for providing a call indicator tool. In an exemplary embodiment the system presents, on the display of a video conference apparatus, a call indicator widget linked with a video conference communication session. The call indicator widget may include (i) at least one selectable feature and (ii) at least one label for presenting information to the customer via the call indicator widget. Through user input the system may receive an indication that the customer selected the at least one feature, and in response to receiving the indication, alter the display to present information related to the selectable feature.

18 Claims, 5 Drawing Sheets

CALL INDICATOR TOOL

BACKGROUND

Customers of businesses, such as financial institutions or the like, that have many customer service outlets, otherwise referred to as centers, branches or the like, have come to expect that the various service outlets will have the immediate capability to address many of their particular special needs or services without the need of a physical visit to any of the service outlets. Likewise, businesses such as financial institutions have begun to streamline their operations for the sake of efficiency as they have come to realize that round-the-clock location of agents at each service outlet/center is inefficient. For example, in the financial institution setting, if each banking center employs at least one full-time mortgage/loan agent, a full-time small business agent and/or a full-time personal financial advisor/agent, the agent may only be called upon in regards to their specialty in the event a customer visits the banking center requiring assistance in the area of specialty.

Certain businesses, such as financial institutions and the like, have addressed the problem associated with staffing service outlets with full-time agents by utilizing video conferencing systems. Specifically, such video conferencing systems may employ two-way video conferencing communication between a customer, who is located at the service outlet/ banking center, home, or the like, and an agent, who is located remotely from the location of the user such as a service outlet/banking center. Both customer and agent receive audio and video feeds of the other participant. Alternatively, a one-way video conferencing system provides the customer a video and audio feed of a remote agent, while the remote agent is limited to receiving an audio feed from the customer. Such video conferencing systems are set-up in private settings within the business to provide the customer assurance that the information exchanged during the communication session is held in private. In this regard, any location equipped with video conferencing communication can provide customers on-demand access to agents having different areas of specialty/expertise without requiring the full-time physical presence of the agent at the business outlet/center or the presence of the customer within the business outlet/center.

In certain instances, it becomes apparent that a customer that is participating in a video conferencing communication session or any other media-based communication desires a means to fluidly navigate through the video conferencing session without being distracted from the conference itself. Currently, in the video conferencing environment the user is limited to simple interactions such as an audio/video feed between themselves and the agent. If the user needs to access other screens or documentation they are tasked with manually accomplishing these acts. The current method does not optimize the full potential of video conference communication sessions.

Therefore, a need exists to develop systems, apparatus, methods, computer program products and the like that provide the user with an streamlined and effortless way to interact with the agent during video conference sessions and navigate through various user interfaces, documentation, and presented information. The desired aspects should alleviate problems related to the burdensome navigation through information presented in video conference sessions. In addition, the desired systems, apparatus, methods, computer program products and the like should allow for customer information, private or otherwise, to be shared amongst all participants of the session so as to eliminate the need of the agent to present information to at a later time, such as when the conference has ended.

BRIEF SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, computer program products or the like for providing a call indicator tool. An exemplary system for providing a call indicator tool may comprise a video conferencing apparatus including a processor, a memory, a display in communication with the processor, a video camera in communication with the processor, a speaker in communication with the processor, and a microphone in communication with the processor, and a video conferencing module. The video conferencing module may be stored in the memory and executable instructions that when executed by the processor cause the processor to transmit an indication that a customer requires communication with a business agent that is remotely located from the customer. The system may then initiate a video conference communication session between the customer and the business agent, wherein initiating the video conference session comprises providing a multimedia interface between the agent and the customer that provides the agent and the customer with an audio and video feedback of one another. In response to initiating the video conference communication session, the system may additionally initiate presentation on the display of a call indicator widget linked with the video conference communication session, wherein the call indicator widget includes (i) at least one selectable feature and (ii) at least one label for presenting information to the customer via the call indicator widget. The system may then receive an indication that the customer selected the at least one feature, and in response to receiving the indication that the customer selected the at least one feature, alter the display to present information related to the selectable feature.

In some embodiments, the call indicator tool is customized based on customer preferences such that the type of the at least one selectable feature is determined based on receiving customer preferences.

In some embodiments, wherein the call indicator widget is configured to include a predetermined maximum number of selectable features, the system may be further configured to restrict the customer from adding a selectable feature to the call indicator tool based on determining the call indicator tool includes the maximum number of selectable features.

In some embodiments, the system may be further configured to dynamically position the call indicator tool, on the display, such that the call indicator tool may be repositioned into one or more non-fixed orientations throughout the video conference communication session.

In some embodiments, the system may be further configured to determine the position of the call indicator tool, on the display, based on (i) determining the video conference communication session is utilizing a template for displaying information to the customer, and (ii) determining whether or not the position of the call indicator tool is overlaying at least a portion of the information, wherein the call indicator tool is presented in a position that does not overlay the at least portion information being displayed to the customer.

In some embodiments, the system may be further configured to determine a level of transparency of the call indicator tool based on determining whether or not the position of the call indicator tool is overlaying at least a portion of information being presented on the display, and in response to determining the call indicator tool is overlaying at least a portion of information being presented on the display, decrease the level of transparency of the call indicator tool, and in response to determining the call indicator tool is not overlaying at least a portion of information being presented on the display, increase the level of transparency of the call indicator tool.

In some embodiments, the information presented on the at least one label for presenting information to the customer via the call indicator widget is non-static such that the information periodically changes based on the status of the video conference communication session.

In some embodiments, the display is configured to toggle between at least one of a document, web page, or video feed in response to receiving an indication that the customer selected the at least one feature.

In some embodiments, wherein the at least one selectable feature comprises a view agent screen feature such that in response receiving an indication that the customer selected the view agent screen feature, the system may be further configured to present a display of the business agent that is remotely located from the customer.

In some embodiments, wherein the at least one selectable feature comprises a view agent text feature such that in response receiving an indication that the customer selected the view agent text feature, the system may be further configured to present a real-time text feed of the business agent that is remotely located from the customer.

In some embodiments, wherein the at least one selectable feature comprises a view documents feature such that in response receiving an indication that the customer selected the view documents feature the system may be further configured to present one or more documents related to the video conference communication session.

In some embodiments, wherein the at least one selectable feature comprises an online banking feature such that in response receiving an indication that the customer selected the online banking feature, the system may be further configured to present an online banking web page related to the video conference communication session.

In some embodiments, wherein the at least one selectable feature comprises confirmation number feature such that in response receiving an indication that the customer selected the confirmation number feature, the system may be further configured to present one or more confirmation numbers related to the video conference communication session.

In some embodiments, the system may be further configured to transmit the call indicator tool to a second video conferencing apparatus such that the second video conferencing is authorized to participate in the linked video conferencing session in response to transmitting the call indicator tool to the second video conferencing apparatus.

As such, the present invention improves the functionality of video conferencing applications and general communication sessions to provide a tool to the user that provides dynamic contextual information such that the information changes when the user takes actions within the tool and thereby optimizes the traditional sense of video conferencing. The tool of the present invention is an improvement over traditional video conference methods because it allows the user to be presented documents, receive confirmation numbers and effortlessly toggle through various aspects of a communication session that would previously require tedious manual input on behalf of the user. The present invention reduces the amount of time it takes for a user to identify and navigate to relevant content associated with the communication session (e.g. documents, forms, online banking screens and the like). In traditional video conferencing, the user is tasked with having to manually navigate on the internet to find documents and screens that are being discussed during the conference. As such, the present invention eliminates the burden that a user faces of trying to manually keep up with the pace of a video conference by providing technical solutions that augment or enhance the functionality of a video conference by implementing various features which the user can easily select and populate their display screen with relevant information. Furthermore, the tool is dynamically presented such that it follows the user through various pages, documents, and video feeds throughout the conference. For at least these reasons, the present invention related to the call indicator tool is significantly more than the traditional video conferencing tools.

In addition, the present invention provides tangible results using the dynamic interface that otherwise could not be achieved without the present invention. The tangible results include documents, replications of the business agents display or text feed such that the results are presented on the display of the user based on the dynamic contextual information provided throughout the video conference, and other user selections within the call indicator tool. In traditional video conferencing, the user is limited to only receiving video and audio feeds from the business agent. In some instances, documents may be presented but the user is unable to physically interact with the document (e.g. edit and make changes, highlight information, and the like). As such, the present invention optimizes traditional video conferences by enhancing the user's interaction with relevant forms, documents, and the business agent themselves. In this way the user is able to verify information being typed by the business agent in real-time based on visual presentations.

Moreover, the system (e.g., processor, or the like) of the present invention allows for the dynamic interface of the call indicator tool to change and provide the tailored features and present specific information as the user selects or deselects features within the tool. The dynamic nature of the interface cannot be performed by a human with pen and paper because among other reasons, the human would not be able to present the dynamic interface that changes in real-time or near real-time as the user takes the different actions described herein with respect to the information, including screen replications of the business agent's display.

The features, functions, and advantages that have been discussed may be achieved independently in various embodiments of the present invention or may be combined with yet other embodiments, further details of which can be seen with reference to the following description and drawings. Additionally, as will be appreciated by one of ordinary skill in the art, the features, functions, and advantages that have been discussed may include and/or be embodied as an apparatus (including, for example, a system, machine, device, computer program product, and/or the like), as a method (including, for example, a business method, computer-implemented process, and/or the like), or as any combination of the foregoing.

BRIEF DESCRIPTION OF THE DRAWINGS

Figure 1:
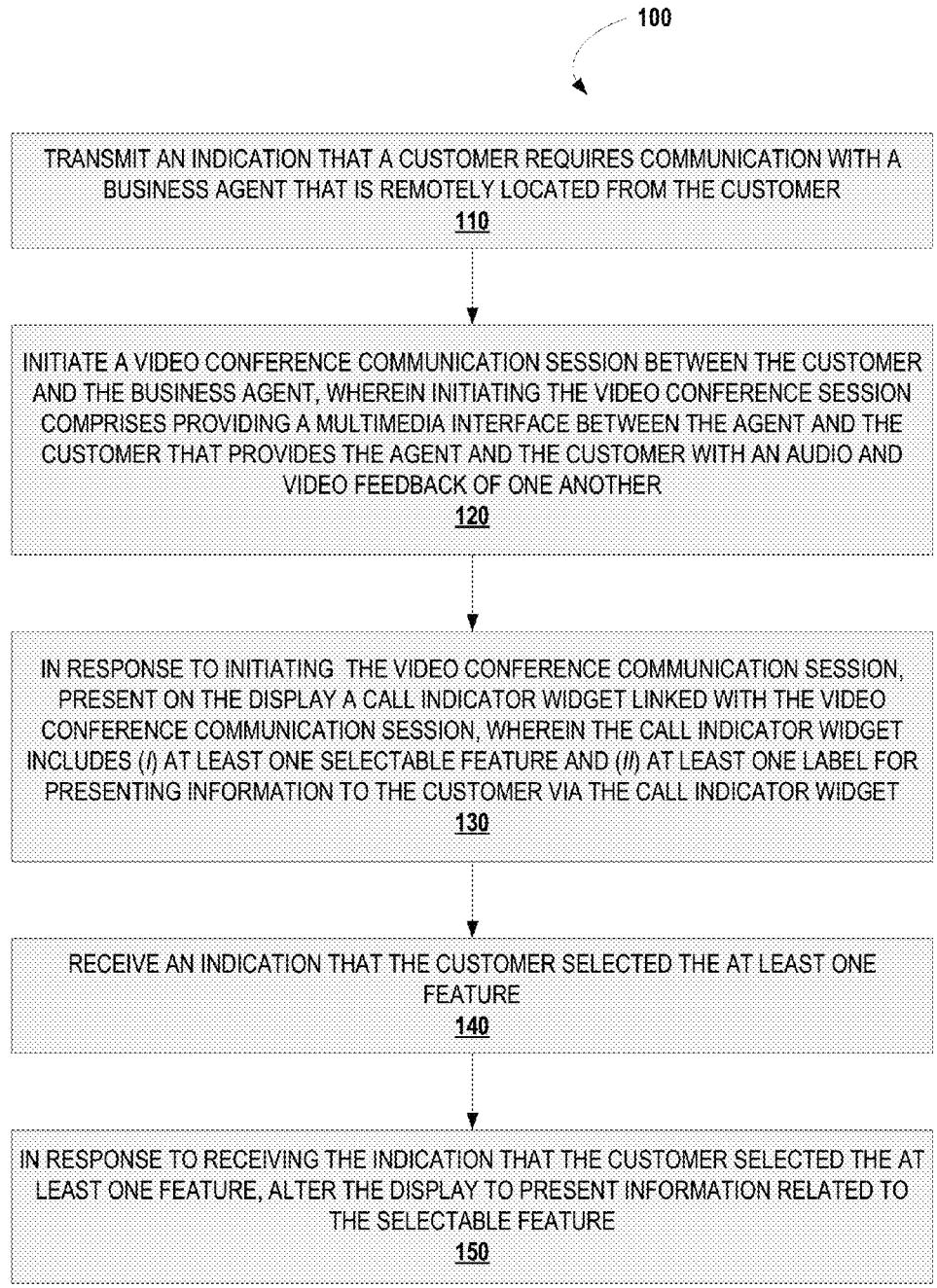
Figure 2:
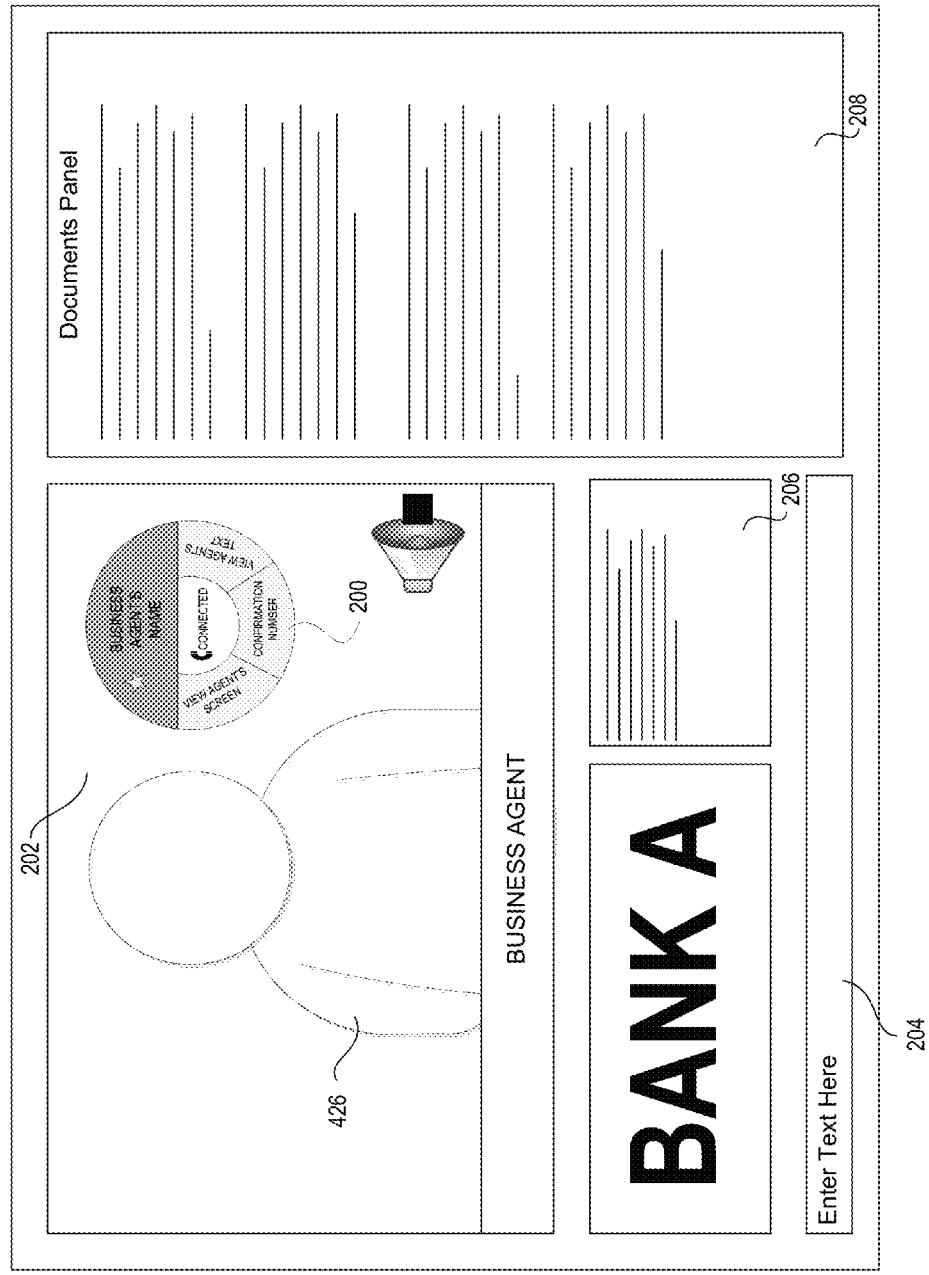
Figure 3A:
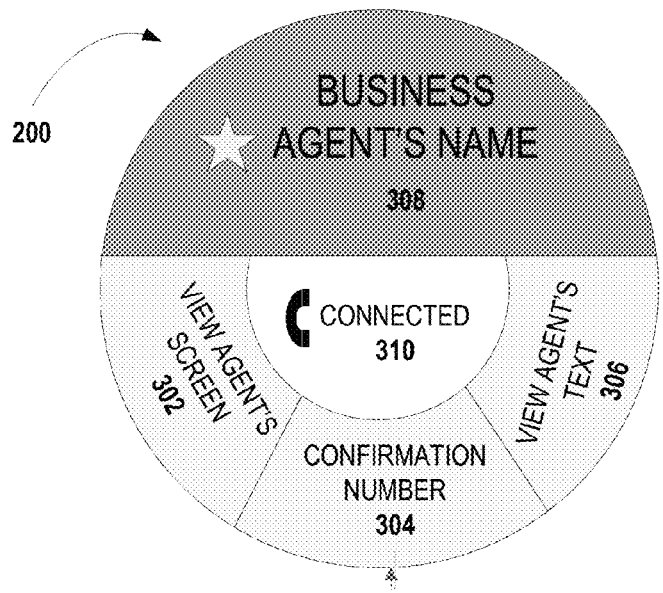
Figure 3B:
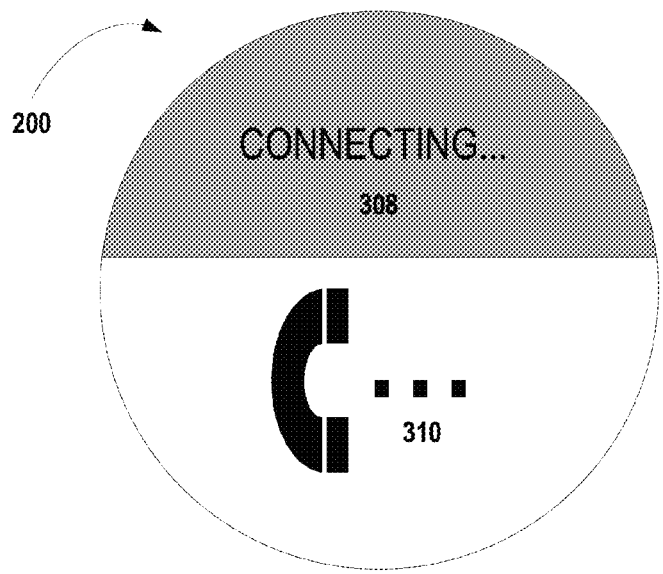
Figure 4:
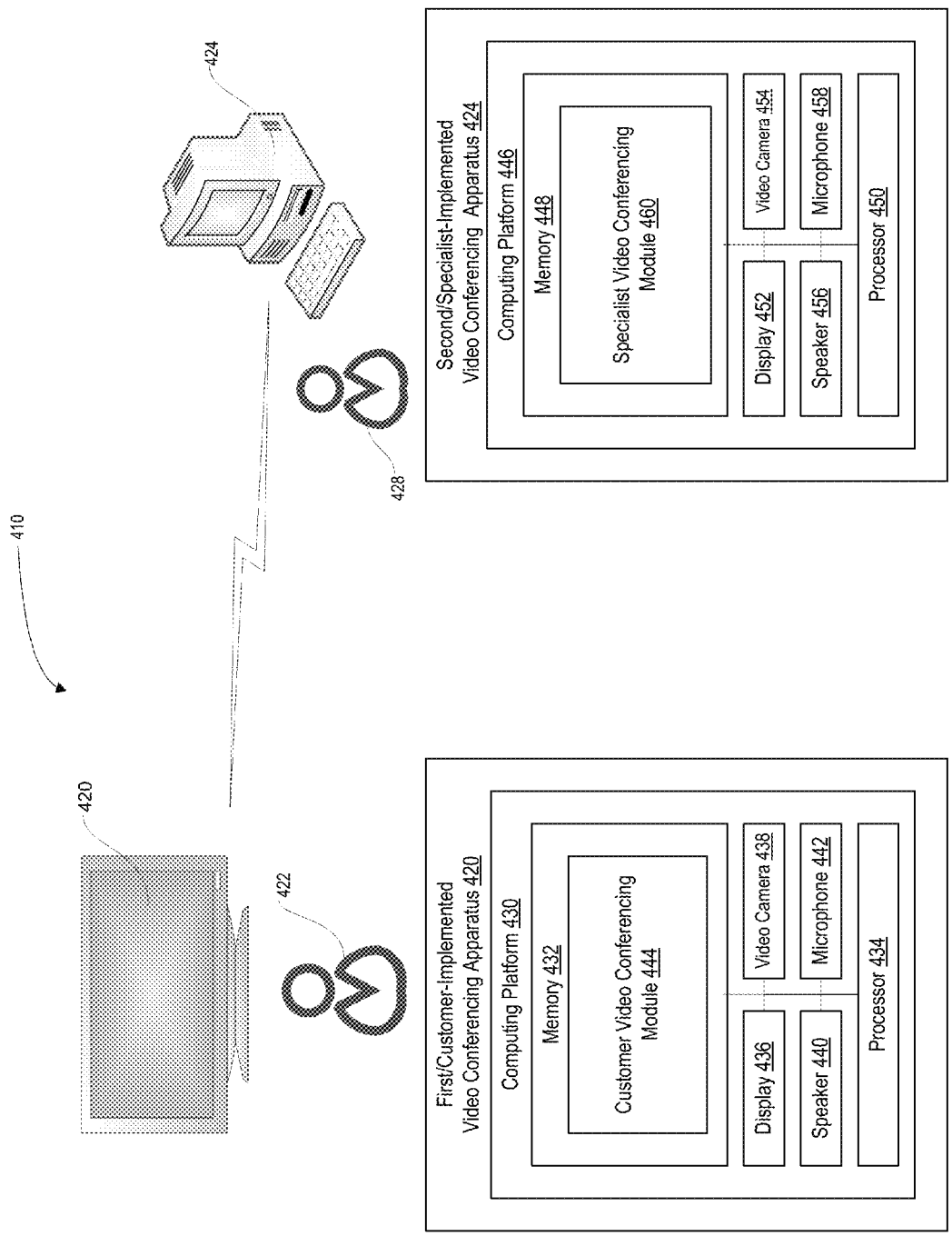
Figure 5:
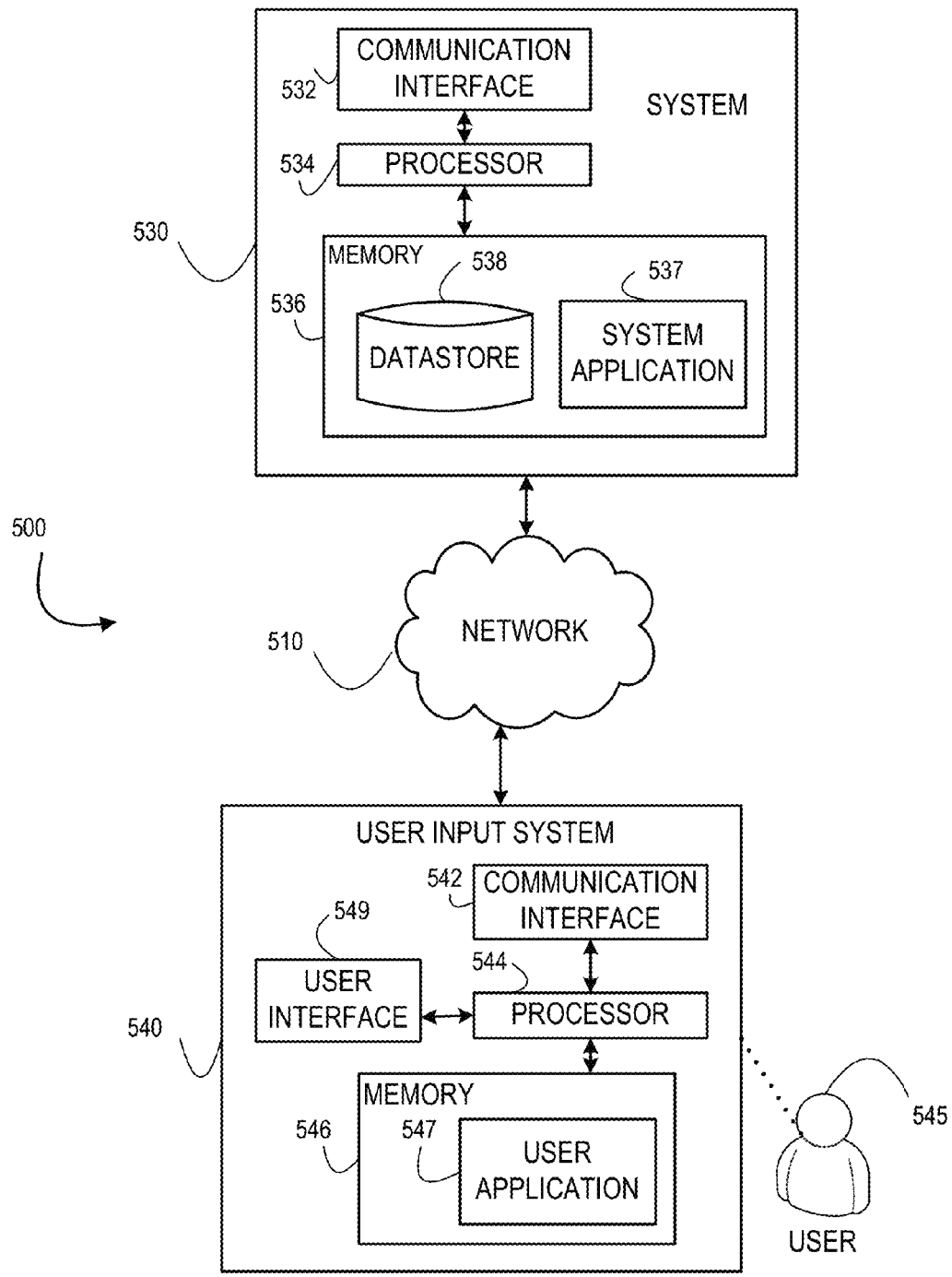

Having thus described embodiments of the invention in general terms, reference will now be made the accompanying drawings, wherein:

FIG. 1 is a flow diagram illustrating a general process flow for implementing a call indicator tool, in accordance with an embodiment of the invention;

FIG. 2 is a schematic illustrating a call indicator tool in conjunction with a video conference apparatus display, in accordance with an embodiment of the invention;

FIG. 3A is a schematic illustrating a call indicator tool, in accordance with an embodiment of the invention;

FIG. 3B is a schematic illustrating a call indicator tool, in accordance with an embodiment of the invention;

FIG. 4 is a schematic and block diagram of a system configured for implementing a call indicator tool, in accordance with an embodiment of the invention; and FIG. 5 is an exemplary system diagram configured for implementing a call indicator tool, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

Embodiments of the invention are directed to systems, methods and computer program products for providing a call indicator tool. The invention enables a customer to utilize a call indicator tool, presented in conjunction with a video conference session, to seamlessly toggle between various displays, documentation, or information related to the video conference session. The customer may additionally utilize the call indicator tool to send request to the business entity or more closely interact with the individual communicating with the customer via a video feed.

In some embodiments, an "entity" may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like.

In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by the entity. In other embodiments, an entity may not be a financial institution.

In some embodiments, the "user" may be a customer of a particular business entity (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded).

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, and the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. More specific examples (e.g., a non-exhaustive list) of the computer-readable medium include the following: a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

Computer program code/computer-readable instructions for carrying out operations of embodiments of the present invention may be written in an object oriented, scripted or unscripted programming language such as Java, Perl, Smalltalk, C++, SAS, SQL, Python, Objective C, and/or the like. However, the computer program code/computer-readable instructions for carrying out operations of the invention may also be written in conventional procedural programming languages, such as the "C" programming language or similar programming languages. The computer program code may alternatively or additionally be written in one or more multi-paradigm programming languages, such as, for example, F#.

Some embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the functions/acts specified in the flowchart and/or block diagram block or blocks.

These computer program instructions may also be stored in a computer-readable medium (e.g., a memory, and the like) that can direct, instruct, and/or cause a computer and/or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Call Indicator Tool

Referring now to FIG. 1, a general process flow 100 is provided for implementing a call indicator tool. In some embodiments, the process flow 100 is performed by a system (i.e., one or more apparatuses) having hardware and/or software configured to perform one or more portions of the process flow 100. In such embodiments, as represented by block 110, the system is configured to transmit an indication that a customer requires communication with a business agent that is remotely located from the customer. As represented by block 120, the system is also configured to initiate a video conference communication session between the customer and the business agent. As represented by block 130, the system is then configured to present on the display a call indicator widget linked with the video conference communication session. As represented by block 140, the system is also configured to receive an indication that the customer has selected the at least one feature. Lastly, as represented by block 150, the system is configured to alter the display to present information related to the selectable feature in response to receiving the indication that the customer has selected the at least one feature.

It will be understood that the system having the process flow 100 can include one or more separate and/or different apparatuses. For example, in some embodiments of the invention, a single apparatus (e.g., customer-implemented video conferencing apparatus 420 described in connection with FIG. 4) is configured to perform all of the portions of process flow 100 represented by blocks 110 to 150. However, in some other embodiments, a first apparatus (e.g., customer-implemented video conferencing apparatus 420 described in connection with FIG. 4 is configured to perform the portions of process flow 100 represented by block and 110 and 120 and a second apparatus (e.g., agent-implemented video conferencing apparatus 424 described in connection with FIG. 4) is configured to perform the portions of process flow 100 represented by blocks 130 to 150.

The system may include a customer-implemented video conference apparatus that is located within a private setting (e.g. a business location or home of the customer), such that the customer can communicate and exchange private information with the system, and more specifically an agent associated with the business and interacting with the customer during the video conference session. In one specific example, the customer-implemented video conference apparatus may be located within an enclosed office space at a financial institution, such as a banking center. In addition, the customer-implemented video conference may include several integrated devices such as a display, a video camera, a speaker, and a microphone, all of which are configured to allow the user to communicate with and view the agent as well as documents presented during the video conference session. The customer-implemented video conference may operate a customer module that is configured to implement the display, the video camera, the speaker, and the microphone within the video conference system to conduct a video (and audio) communication session (e.g., a video chat session) with an agent that is located physically remote from the location at which the customer-implemented video conference is located. It should be noted that, as used herein, the term video conferencing apparatus may refer to the customer-implemented video conferencing apparatus and the agent-implemented video conferencing apparatus operating in conjunction with one another as such the customer-implemented video-conferencing apparatus may be configured to process functions described in conjunction with the video-conferencing apparatus and vice versa.

At block 110, the system transmits an indication that a customer requires communication with a business agent that is remotely located from the customer. The indication may be embodied as a request from the customer to initiate a video conference session between the customer and an agent of a particular business such as a financial institution. The request may be received from within a platform such as an online banking platform in which the indication may be transmitted directly from a server of financial institution to an agent-implemented video conference apparatus. For example, the customer may access their online banking account using various customer authentication credentials, after accessing the online banking account the customer may request (from within the online banking platform specifically associated with the customers bank account) to initiate a video conference session with an agent of the financial institution. The request may then be transmitted by an online banking server to the video conference apparatus of an agent that is qualified to handle the customer's request. In this way, the agent may receive a transmitted indication that a customer is attempting to connect with them via a video conference session.

It should be noted that although, in the embodiments discussed herein, the customers "request to communicate with a business agent" is implemented by a video conference session, the "request to communicate" may also refer to or include initiating a telephone call, a chatting window, email correspondence, and other forms of electronic communication not explicitly contemplated here. In this way, the video conference apparatus may refer to other computing devices such a mobile phones, landline telephones, laptop computers, desktop computers, computing tablets, and other devices configured to support various forms of electronic communication.

As such, the transmitted request or indication may comprise information relevant to establishing a network connection between an apparatus of the customer (e.g. customer-implemented video conference apparatus) and an apparatus of the agent (e.g. agent-implemented video conference apparatus). The information relevant to establishing a network connection between the apparatuses or devices of the agent and the customer may include but not be limited to machine identifying information (e.g. domain, name, IP address, and the like), email address, telephone number, video-conference system customer name, and the like). After receiving the required information, the system may establish a network connection between a video conference system and a mobile device of a customer. In an exemplary embodiment, the video conference system is maintained by an entity such as a financial institution and the customer has an account with the financial institution.

In some embodiments, the established network connection between the customer-implemented video conference apparatus and agent-implemented video conference apparatus facilitates a two-way communication system between the agent-implemented apparatus and the customer-implemented apparatus. Through the two-way communication system, the agent-implemented apparatus is configured to send and receive data to and from the customer-implemented apparatus, and the customer-implemented apparatus is configured to send and receive data to and from the agent-implemented apparatus. In some embodiments, information is sent from the customer-implemented apparatus and received at the agent-implemented apparatus in response to the agent-implemented apparatus sending a request for information/data to the customer's customer-implemented apparatus. For example, the specialist may request information from the customer-implemented apparatus that may aid in authenticating the customer's identity. The customer-implemented apparatus may then send the agent-implemented apparatus one or more customer authentication credentials in response to receiving the request. In some embodiments, information is sent from the agent-implemented apparatus and received at the customer-implemented apparatus in response to the customer-implemented apparatus sending a request for information/data. For example, the customer may use the customer-implemented apparatus, and more specifically the call indicator tool, to send a request for a particular set of forms to be received from the agent-implemented apparatus, and more specifically the associated specialist. In response to the request, the specialist may then send the forms to the customer's customer-implemented apparatus via the agent-implemented apparatus. The forms may additionally be sent automatically based on other factors presented within the video conference session without a need for external input from either the customer or the specialist. In other embodiments, information may be exchanged between the agent-implemented apparatus the customer-implemented apparatus on a continuous and/or semi-continuous basis. For example, the agent-implemented apparatus and the customer-implemented apparatus may continuously exchange call/video log information related to the history of a video conference session that has been initiated between the agent-implemented apparatus and the customer-implemented apparatus. In this way, a record or log of the session and documents or information exchanged may be maintained on both the agent-implemented apparatus and the customer-implemented apparatus.

At block 120, after transmitting an indication that a customer requires communication with a business agent that is remotely located from the customer, the system may then initiate a video conference communication session between the customer and the business agent. Initiating the video conference session comprises providing a multimedia interface between the agent and the customer such that the agent and the customer are provided with an audio and video feedback of one another. As shown in FIG. 2, the video conference session may allow the user to communicate and/or view a business agent via a video and/or audio feed 202 presented on a display within the video conference apparatus. As further illustrated in FIG. 2, through the display or other applications provided on the display (e.g. call indicator too), the user may have access to a range of functions including chatting capabilities through text input boxes 204 and dialogue boxes 206, the ability to review information presented by the specialist via document presentation panels 208, and the ability to navigate throughout the video conference communication session utilizing the call indicator tool 200.

In some embodiments, initiating a video conference session between an agent of the business and the customer may further comprise authenticating the customer's identity prior to initiating the session. However, in other embodiments, if the request to communicate with the agent was received from within a previously authenticated platform (e.g. from within the online banking platform), the authentication step may not be necessary or a less stringent form of authentication may be used. In an exemplary embodiment, the authentication is based at least partially on customer input or general information that verifies that customer is an account holder of the financial institution. The customer input or general information may be received from the customer-implemented apparatus via the established network connection. The customer input or general information may typically comprise one or more authentication credential associated with the customer. The requested and/or received authentication credentials may vary based on the type of video conference session being initiated, and more specifically the type of transactions that the customer may complete (or is expected to complete) throughout the session. In this way, numerous types and levels of customer authentication may exist, and the customer may be initially authenticated for a primary level of access to conduct general transactions within the video conference session, and the customer may be required to provide a subsequent stricter authentication in an instance where a need exist to conduct a transaction that is not provided within the primary level of access received. For example, the primary level of access may include the customer being able to verify that they are an account holder with the entity (e.g. financial institution) by providing an account number and related password such that the customer is able to interface with an agent and ask questions about loan options that the financial institution offers. In an event that the customer decides to apply for a loan while within the video conference session, the customer may be required to provide additional authentication credentials, such as a social security number, prior to being sent a loan application form. In some embodiment, the received authentication credentials may be used by the agent and/or the video conference system to prepare documents (e.g. a loan application) for use within the video conference session. The customer authentication credentials that may be sent via the customer-implemented apparatus may include, but not be limited to, a customer name, password, account number, full-length social security number or partial digits, challenge questions, familiar pictures and/or phrases, biometrics, key fob-based alphanumeric codes, and the like. In some embodiments, the customer authentication credentials are explicitly provided by the customer, and in other embodiments the customer authentication credentials are stored within the customer's customer-implemented apparatus and automatically transferred, in response to a request, to the video conference system on the customer's behalf.

In an alternate embodiment, the customer's identity is authenticated prior to establishing a secured network connection. In such an embodiment, the system may first establish a general and/or unsecured network connection with the customer-implemented apparatus solely for the purpose of authenticating the customer's identity. Information transmitted through the unsecured network connection, such as sensitive customer information maintained within customer authentication credentials, may be required to be encrypted prior to being sent from the customer-implemented apparatus to the video conference system. As such the customer-implemented apparatus may separately send a decryption key to the video conference system. After the customer has been authenticated and the customer's identity has been subsequently verified, the system may then establish a secure network connection between the video conference system and the customer-implemented apparatus of the customer such that sensitive information (e.g. customer financial data) may be transmitted through the secured without requiring encryption prior to being sent.

At block 130, in response to initiating the video conference communication session, the system may then present a call indicator widget linked with the video conference communication session. The call indicator may be presented at any orientation or configuration about the display of the customer-implemented video conference apparatus. As previously mentioned, through the call indicator widget, the customer may have access to a range of functions. As illustrated in FIG. 3, the call indicator widget includes at least one selectable feature (310, 320, 330), and at least one label (340, 350) for presenting information to the customer. The features may include but not be limited to accessing/viewing documents, accessing online banking services, altering the video screen, receiving confirmation numbers 320 throughout the session, accessing text related to notes taken by the agent 330, viewing the display of the agent and/or the documents being filled out by the agent 310, providing transparency to what the agent is typing, and the like. The features may additionally include more traditional features related to communication sessions including, but not limited to, the ability to control the video call or communication session (e.g., mute, block video view, upload/download docs, provide a wait time, queue number, or the like).

A predetermined number of features may be displayed on the call indicator widget where the exact number of features may be predetermined by the business associated with the video conference session, the customer, or a third-party developer of the widget. Additionally, the types of features that are presented within the call indicator widget may be initially determined by the business entity (e.g. financial institution) and the customer may be able to further customize the types of features that are presented within the call indicator tool. For example, the customer may be presented from within the online banking platform an option to select which features will be presented in the call indicator widget once a video conference session has been initiated. The option may be presented simultaneously as the request to communicate with the agent is being transmitted and prior to the video conference session being initiated between the customer and the agent. In other embodiments, the option may be presented prior the request to communicate with the agent is ever received. In an embodiment where the exact number of features provided within the call indicator widget has been predetermined by the business associated with the video conference session, the business may be able to further specify a maximum or minimum number of features that are allowable within the call indicator widget. In this way, the customer may be restricted from adding additional customized features to the call indicator widget after the maximum number of features (as specified by the business) has been reached.

The call indicator widget/tool is configured to be dynamically positioned about the display of the customer-implemented apparatus in various non-fixed orientations as opposed to being presented in a static or fixed position. The call indicator tool may follow the user from page to page and screen to screen as the customer and business agent navigate through documents and account activity, and/or allow the user to toggle between various pages by selecting the page from within the call indicator tool features. After initial presentation of the widget tool on the customer-implemented apparatus display the call indicator tool may be rearranged by the customer in various non-fixed orientations. The customer may be able to select the call indicator widget and drag-and-drop the widget into any desired position on the display. The initial position at which the widget is presented on the display may be defined by the business associated with the video conference session, the customer, or a third-party developer of the widget. For example, if the business is a financial institution that has a default template used to conduct their video conference sessions with customers, the financial institution may specify that the initial position of the widget should be specific location on the display that corresponds to an empty location on the template in which information is not otherwise displayed. In another example, the customer may have a personal visual preference for how they prefer to view documents, icons, widgets and the like on their computer screens or apparatus displays, the customer may then specify that the initial position of the widget should be specific location on the display according to their personal preference. The call indicator tool may then be automatically and/or manually repositioned throughout the video conference session either based on changes in the template or changes in the preference of the customer.

In some embodiments, in addition to automatically positioning or repositioning the call indicator tool on the display of the video conference apparatus, the system may be further configured to determine a level or percentage of transparency for the call indicator tool based on the position of the call indicator tool. For example, if important information is being presented on the display and the call indicator tool is overlapping or positioned on top of the information, the system may be configured to determine that the call indicator tool is obstructing the view of important information that the customer needs to read, and automatically determine to increase the transparency of the call indicator tool thus allowing the customer to view the information without the need of repositioning the call indicator widget. Alternatively, if the important information is removed throughout the session or the call indicator tool is no longer positioned on top of any information within the display, the system may be configured to determine that a currently transparent call indicator widget is no longer obstructing the view of important information that the customer needs to see, and automatically determine to decrease the transparency of the call indicator tool thus allowing the customer to more easily view the options, features, or information presented within the call indicator widget.

In some embodiments, in addition to automatically positioning or repositioning the call indicator tool on the display of the video conference apparatus, the system may be further configured to determine whether or not to minimize the call indicator tool based on the position of the call indicator tool, the status of the communication session (e.g. in queue, connected, on-hold, transferring, and the like), or the location of content being displayed on the display. For example, if important information is being presented on the display and the call indicator tool is overlapping or positioned on top of the information, the system may be configured to determine that the call indicator tool is obstructing the view of important information that the customer needs to read, and automatically determine to minimize the call indicator tool while the information is being presented. Alternatively, if the important information is removed throughout the session or the call indicator tool is no longer positioned on top of any information within the display, the system may be configured to determine that a currently minimized call indicator widget is no longer obstructing the view of important information that the customer needs to see, and automatically determine to maximize the call indicator tool on the display thus allowing the customer to more easily view the options, features, or information presented within the call indicator widget.

The call indicator tool may further comprise an on/off mode. When turned "on", the system may be configured to determine to present the call indicator tool on the display. Likewise, when turned "off" the system may be configured to determine to not present the call indicator tool on the display. The call indicator tool may be placed in either on or off mode at any time before, during, or after the video conference session based on input or user preferences from the customer or the business agent, the type of communication session initiated between the customer and the business agent, one or more business rules or the like.

The information presented on the at least one label 240 for presenting information to the customer, may change based on the status of the communication session. For example, in some embodiments, the call indicator widget may be presented on the customer-implemented video apparatus prior to a video feed being established between the customer and an agent. In this way, an agent label may initially indicate that the customer is "Connecting . . . " to an agent and upon establishing a video feed connection with the agent, the agent label may change and instead present the connected agents name. In another example, a video status label may indicate that the video conference audio feed is not muted and the agent is able to receive and hear audio feed from the customer, and in response to the customer selecting to mute the audio, the video status label may indicate that the video conference audio feed is muted and the agent is not able to receive or hear audio feed from the customer.

At blocks 140, after presenting the call indicator widget linked with the video conference communication session, the system may receive an indication that the customer selected the at least one feature, and at block 150, in response to receiving the indication that the customer has selected the at least one feature, the system alters the display to present information related to the selected feature. The features may be embodied within the call indicator widget by a series of buttons, links, icons, and/or a combination of the aforementioned. As such, the system may receive an indication that the customer has selected a features in response to the customer clicking a button, link, or icon, providing a gesture (either using their hand, a mouse, or keypad), by providing a voice command or the like.

The call indicator tool features may allow the customer to toggle between documents, online banking services, the video feed display screen, access confirmation numbers for the communication session, access text related to notes taken by the business agent, view the desktop display screen of the business and/or the documents being filled out by the business agent, provide transparency to what the business agent is typing (e.g., social security number, addresses, other profile information of the customer). The call indicator tool features may also include the ability to control the video call (e.g., mute, block video view, upload/download docs, provide a wait time, queue number, or the like). In some embodiments, the call indicator tool may automatically toggle in between features based on the status of the communication session (e.g. in queue, connected, on-hold, transferring, and the like).

The call indicator widget features may comprise a view agent screen and/or display feature 310 that allows the customer to view the display of the business agent that the customer is communicating with through the video feed. In response to selecting the view agent screen feature, the system alters the display of the customer-implemented video conference apparatus such that at least a portion of the display includes a real-time presentations of the business agents display, where the customer is able to view in real-time a remote replication of the display of the agent including any changes that are made in real-time to the agents display. The display of the agent may be presented on at least a portion (e.g. a quarter of the display, half of the display, the whole display) of the display of the customer-implemented video conference apparatus, where the customer may initially specify or change how much of their display is occupied by the replication of the agents display. For example, half of the customer-implemented apparatus display may be allocated to presenting the video feed of the agent and the other half of the display may be allocated to present a replication of the agents display.

Similarly, with information presented in response to other selected features discussed herein, the customer may initially specify or change in real-time how much of their display is occupied by the presented information. As such, in one embodiments, the information (including the video feed) presented in response to the selection of a feature within the call indicator widget, is presented in a separate window from the video feed allowing the user to individually reposition various pieces of information presented on their display to a desired location.

The call indicator widget features may comprise a view agent text feature 330 that allows the customer to view the text that the business agent is currently typing. In response to selecting the view agent text feature, the system alters the display of the customer-implemented video conference apparatus such that at least a portion of the display includes a real-time text feed of the text that the business agent is currently typing, where the customer is able to view in real-time the text feed of the agent. The customer may be additionally able to interact with the presented text feed in order to prompt the agent of a mistake within the typed text. For example, in one embodiment, the customer may highlight, within the real-time text feed, a portion of the typed text that is incorrect. The highlighted portion of text may then be presented on the agents display allowing the agent to readily recognize what needs to be corrected. In another example, the customer may correct the text themselves such that the corrected text may be presented on the agents display allowing the agent to easily copy and paste the correct information onto their user interface. In yet another example, the customer may press a button, provide a gesture, or provide a voice command to indicate that a portion of the typed text is incorrect. An indication (e.g. warning message) that a portion of the typed text is incorrect may then be presented on the agents display allowing the agent to be prompted to stop and make corrections where necessary. In some embodiments a combination of a warning message and specific indication (e.g. highlighted text, corrected text) of which text is incorrect may be presented to the agent. In one example the system is configured to automatically toggle in between the current content of the display and a text feed or video display of the business agent in response to the business agent typing. For example, if the business agent begins to type user information into a form, the system may display either a text feed of the business agent, the display of the business agent, or the duplication of the form comprising the text as it is being inputted by the business agent.

The call indicator widget features may comprise a view documents feature that allows the customer to view documents related to their account or the video conference session that are being presented by the system, or more specifically the agent. In response to selecting the view documents feature, the system alters the display of the customer-implemented video conference apparatus such that at least a portion of the display includes a presentation of one or more documents related to the customer account. In embodiments, where multiple documents are presented, the documents may be presented in a package (e.g. a portable document format ("PDF")) where the customer is able to navigate through the package to view the individual documents therein. In some embodiments, in response to selecting the view documents feature, the customer may be first presented with a list (e.g. a drop down list) of documents that are available for presentation and subsequently presented in response to the selection of a specific document. Additionally, in some embodiments, the label associated with the view documents feature on the call indicator widget may change to specify the name of the document that is currently being presented.

The call indicator widget features may comprise an online banking feature that allows the customer to view various pages related to their online banking account as is presented within the online banking platform. In response to selecting the online banking feature, the system alters the display of the customer-implemented video conference apparatus such that at least a portion of the display includes a presentation of an online banking page associated with the customer's account. In one embodiment, the system is configured to determine what page within the online banking account is related to the current topic being discussed during the video conference session or related to the customer's request for the video conference session, and in response to selecting the online banking feature the system may automatically present the determined relevant page as opposed to a home page associated with the online banking user interface. For example, the customer may request to initiate a video conference communication session to dispute a particular transaction such that in response to selecting the online banking feature the user is presented with an online banking page comprising the account statement that includes the transaction being disputed.

The call indicator widget features may comprise a confirmation number feature 320 that provides the customer with a confirmation number related to various aspect of the video conference session (e.g. request processed during the video conference session, documentation sent/received, and the like) or a confirmation number for the communication session itself. In response to selecting the online banking feature, the system may either alter the display of the customer-implemented video conference apparatus such that at least a portion of the display includes a presentation of a confirmation number or the system may be prompted to provide the confirmation number to the customer by various other means including but not limited to, text messaging, multimedia message, online banking messages, email, and the like.

The call indicator widget features may comprise a feedback feature that allows the customer to provide real-time feedback during the video conference communication session. In response to selecting the feedback feature, the system may alters the display of the customer-implemented video conference apparatus such that at least a portion of the display includes an interface that allows the user to input feedback as it relates to the video conferencing communication session.

The call indicator widget features may comprise a "show me", illustration, or example feature that allows the customer to view documents, tutorials, or receive real-time walk through from the business agent at request. The information received may be related to helping the customer fill out forms, navigate through websites (e.g. online banking site), and the like. In response to selecting the "show me" feature, the system alters the display of the customer-implemented video conference apparatus such that at least a portion of the display includes a presentation of one or more documents or video feeds designed to help the customer learn a specific task that the customer does not understand or needs more information about. For example, the business agent may display a form that needs to be filled out by the customer, and in response to selecting the show me feature the system alters the display the display of the customer-implemented video conference apparatus such that at least a portion of the display includes a presentation of tutorial video or example form designed to help the user fill out the form.

In addition to presenting the call indicator widget linked with the video conference communication session on a display of the video conference session, the system may also be configured to transmit or communicate the linked call indicator widget to a second video conferencing apparatus. The call indicator tool may be transmitted via text messaging, multimedia messaging, email, or other contactless forms of communication such as Bluetooth, Near Field Communication ("NFC"), and the like. In some embodiments, the location or primary location of the video conference communication session is changed to the receiving apparatus in response to transmitting or communicating the linked call indicator widget to a second video conferencing apparatus. For example, the video conference communication session may have been initiated on a customer's desktop computer and the customer may need to be mobile during the session but not want to disconnect the communication session. The customer may then transmit the linked call indicator tool to a second device (e.g. a mobile device) such that the mobile device is changed to the new location of the video conference communication session.

In addition to being transmitted amongst customer-implemented apparatuses the call indicator tool may be shared amongst other apparatuses of users that the customer wants to include in the video conference communication session. For example, a husband may want to include his wife (who is not currently with him) in a video conference communication session. The husband may then share or transmit the linked call indicator tool to the mobile device of his wife such that upon receiving the call indicator tool, and the call indicator tool being presented on the user-implemented apparatus (e.g. mobile device) of his wife, she may be authorized to participate in the video conference communication session, and the video conference communication session may be initiated on her mobile device.

In some embodiments, in response to transmitting the linked call indicator tool to a second customer-implemented or third-party user-implemented apparatus, the system may require a level of authentication prior to initiating the video conference communication session on the customer-implemented or third-party user-implemented apparatus. The level of authentication may vary (e.g. hard/multiple factor authentication, soft/single factor authentication, no authentication) based on the device or individual that the call indicator tool is being transmitted to. For example, if the call indicator tool is being transmitted to a mobile device of the customer that has been previously authenticated to use with their online banking application, then the level of authentication may vary from soft authentication to no authentication. Alternatively, if the call indicator tool is being transmitted to a public device or a device that has been detected by the system to be using a public network (e.g. local coffee shop), the level of authentication required may be a multiple factor authentication. In other embodiments, the call indicator tool may comprise an embedded authentication token such that in response to receiving the linked call indicator tool, the user-implemented apparatus or associated individual is automatically authenticated for communication with the agent and initiation of the video conference communication session on the receiving apparatus.

Call Indicator Tool System and Environment

Referring to FIG. 4, a combination schematic and block diagram is presented of a system 410 for implementing a call indicator tool, in accordance with an embodiment of the invention. The system 410 includes a first or customer-implemented video conferencing apparatus 420 that is located within a private setting, such that the customer 422 can communicate and exchange private information with a business agent 426 through designated communication devices. In one specific example, the customer-implemented video conference apparatus 420 may be located within the customer's home. The customer-implemented video conferencing apparatus 420 includes a computing platform 430 having a memory 432 and a processor 34 in communication with memory 432. In addition, customer-implemented video conferencing apparatus 20 includes a display 436, a video camera 438, a speaker 440 and a microphone 442, all of which are in communication with the processor 434 and may be embodied in hardware and/or software. The video conferencing apparatus 420 may include more than one device, such as dedicated, stationary video conferencing devices or the video conferencing apparatus 420 may be a single device, such as a mobile device (i.e., computing tablet or the like). The memory 432 of video conferencing apparatus 420 stores customer video conferencing module 44 that is configured to implement the display 436, the video camera 438, the speaker 440 and the microphone 442 to conduct a video (and audio) communication session (i.e., a video chat session) with a business agent 426 that is located physically remote from the business location at which the first/customer-implemented video conferencing apparatus 420 is located.

The customer-implemented video-conferencing apparatus 420 is in network 412 communication (wired, wireless or a combination thereof) with a second or agent-implemented video conferencing apparatus 424. Agent-implemented video conferencing apparatus 424 may be any communication device that facilitates audio and video communication, such as personal computer (PC), laptop computer, mobile computing device (e.g., tablet device, mobile/cellular telephone) or the like. The agent-implemented video conferencing apparatus 424 includes a computing platform 446 having a memory 448 and a processor 450 in communication with memory 448. In addition, second video conferencing apparatus 424 includes a display 452, a video camera 454, a speaker 456 and a microphone 458, all of which are in communication with the processor 450 and may be embodied in hardware and/or software. The memory 448 of second/agent-implemented video conferencing apparatus 424 stores agent video conferencing module 460 that is configured to implement the display 452, the video camera 454, the speaker 456 and the microphone 458 to conduct a video (and audio) communication session (i.e., a video chat session) with a customer 422 that is located at the customer-implemented video conferencing apparatus 420.

FIG. 5 is an exemplary block diagram illustrating technical components of a system 500 for implementing a call indicator tool as described in the process flow described in FIG. 1. As illustrated, the system environment 500 includes a network 510, a system 530, and a user input system 540. Also shown in FIG. 5 is a user 545 of the user input system 540. The user input system 540 may be any computing device. The user 545 may be a person who uses the user input system 540 to execute a user application 547. The user application 547 may be an application to communicate with the system 530, perform a transaction, input information onto a user interface presented on the user input system 540, or the like. The user application 547 and/or the system application 537 may incorporate one or more parts of any process flow described herein.

As shown in FIG. 5, the system 530, and the user input system 540 are each operatively and selectively connected to the network 510, which may include one or more separate networks. In addition, the network 510 may include a telecommunication network, local area network (LAN), a wide area network (WAN), and/or a global area network (GAN), such as the Internet. It will also be understood that the network 510 is secure and may also include wireless and/or wireline and/or optical interconnection technology.

The user input system 540 may include any computerized apparatus that can be configured to perform any one or more of the functions of the user input system 540 described and/or contemplated herein. For example, the user 545 may use the user input system 540 to transmit and/or receive information or commands to and from the system 530. In some embodiments, for example, the user input system 540 may include a personal computer system (e.g. a non-mobile or non-portable computing system, or the like), a mobile computing device, a personal digital assistant, a mobile phone, a tablet computing device, a network device, a wearable computing device, a sensor, and/or the like. As illustrated in FIG. 5, in accordance with some embodiments of the present invention, the user input system 540 includes a communication interface 542, a processor 544, a memory 546 having a user application 547 stored therein, and a user interface 549. In such embodiments, the communication interface 542 is operatively and selectively connected to the processor 544, which is operatively and selectively connected to the user interface 549 and the memory 546. In some embodiments, the user 545 may use the user application 547 to execute processes described with respect to the process flow and interfaces described herein. Specifically, the user application 547 executes the process flow described in FIG. 1.

Each communication interface described herein, including the communication interface 542, generally includes hardware, and, in some instances, software, that enables the user input system 540, to transport, send, receive, and/or otherwise communicate information to and/or from the communication interface of one or more other systems on the network 510. For example, the communication interface 542 of the user input system 540 may include a wireless transceiver, modem, server, electrical connection, and/or other electronic device that operatively connects the user input system 540 to another system such as the system 530. The wireless transceiver may include a radio circuit to enable wireless transmission and reception of information. Each processor described herein, including the processor 544, generally includes circuitry for implementing the audio, visual, and/or logic functions of the user input system 540. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 547 of the memory 546 of the user input system 540.

Each memory device described herein, including the memory 546 for storing the user application 547 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 5, the memory 546 includes the user application 547. In some embodiments, the user application 547 includes an interface for communicating with, navigating, controlling, configuring, and/or using the user input system 540. In some embodiments, the user application 547 includes computer-executable program code portions for instructing the processor 544 to perform one or more of the functions of the user application 547 described and/or contemplated herein. In some embodiments, the user application 547 may include and/or use one or more network and/or system communication protocols.

Also shown in FIG. 5 is the user interface 549. In some embodiments, the user interface 549 includes one or more output devices, such as a display and/or speaker, for presenting information to the user 545. In some embodiments, the user interface 549 includes one or more input devices, such as one or more buttons, keys, dials, levers, directional pads, joysticks, accelerometers, controllers, touchpads, touchscreens, haptic interfaces, microphones, scanners, motion detectors, cameras, and/or the like for receiving information from the user 545. In some embodiments, the user interface 549 includes the input and display devices of a mobile device, which are operable to receive and display information.

FIG. 5 also illustrates a system 530, in accordance with an embodiment of the present invention. The system 530 may refer to the "apparatus" described herein. The system 530 may include any computerized apparatus that can be configured to perform any one or more of the functions of the system 530 described and/or contemplated herein. In accordance with some embodiments, for example, the system 530 may include a computer network, an engine, a platform, a server, a database system, a front end system, a back end system, a personal computer system, and/or the like. Therefore, the system 530 may be a server managed by the entity. The system 530 may be located at the facility associated with the entity or remotely from the facility associated with the entity. In some embodiments, such as the one illustrated in FIG. 1, the system 530 includes a communication interface 532, a processor 534, and a memory 536, which includes a system application 537 and a datastore 538 stored therein. As shown, the communication interface 532 is operatively and selectively connected to the processor 534, which is operatively and selectively connected to the memory 536.

It will be understood that the system application 537 may be configured to implement any one or more portions of the various user interfaces and/or process flow described herein. The system application 537 may interact with the user application 547. It will also be understood that, in some embodiments, the memory includes other applications. It will also be understood that, in some embodiments, the system application 537 is configured to communicate with the datastore 538, the user input system 540, or the like.

It will be further understood that, in some embodiments, the system application 537 includes computer-executable program code portions for instructing the processor 534 to perform any one or more of the functions of the system application 537 described and/or contemplated herein. In some embodiments, the system application 537 may include and/or use one or more network and/or system communication protocols.

In addition to the system application 537, the memory 536 also includes the datastore 538. As used herein, the datastore 538 may be one or more distinct and/or remote datastores. In some embodiments, the datastore 538 is not located within the system and is instead located remotely from the system. In some embodiments, the datastore 538 stores information or data described herein.

It will be understood that the datastore 538 may include any one or more storage devices, including, but not limited to, datastores, databases, and/or any of the other storage devices typically associated with a computer system. It will also be understood that the datastore 538 may store information in any known way, such as, for example, by using one or more computer codes and/or languages, alphanumeric character strings, data sets, figures, tables, charts, links, documents, and/or the like. Further, in some embodiments, the datastore 538 may include information associated with one or more applications, such as, for example, the system application 537. It will also be understood that, in some embodiments, the datastore 538 provides a substantially real-time representation of the information stored therein, so that, for example, when the processor 534 accesses the datastore 538, the information stored therein is current or substantially current.

It will be understood that the embodiment of the system environment illustrated in FIG. 5 is exemplary and that other embodiments may vary. As another example, in some embodiments, the system 530 includes more, less, or different components. As another example, in some embodiments, some or all of the portions of the system environment 500 may be combined into a single portion. Likewise, in some embodiments, some or all of the portions of the system 530 may be separated into two or more distinct portions.

In addition, the various portions of the system environment 500 may be maintained for and/or by the same or separate parties. It will also be understood that the system 530 may include and/or implement any embodiment of the present invention described and/or contemplated herein. For example, in some embodiments, the system 530 is configured to implement any one or more of the embodiments of the process flows described and/or contemplated herein in connection any process flow described herein. Additionally, the system 530 or the user input system 540 is configured to initiate presentation of any of the user interfaces described herein.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for providing a call indicator tool, the system comprising:
    a video conferencing apparatus including a processor, a memory, a display in communication with the processor, a video camera in communication with the processor, a speaker in communication with the processor, and a microphone in communication with the processor; and
    a video conferencing module stored in the memory, comprising executable instructions that when executed by the processor cause the processor to:
    transmit an indication that a customer requires communication with a business agent that is remotely located from the customer;
    initiate a video conference communication session between the customer and the business agent and a first video conference apparatus, wherein initiating the video conference session comprises providing a multimedia interface between the agent and the customer that provides the agent and the customer with an audio and video feedback of one another;
    in response to initiating the video conference communication session, initiate presentation on the display of a call indicator widget linked with the video conference communication session, wherein the call indicator widget includes (i) at least one selectable feature and (ii) at least one label for presenting information to the customer via the call indicator widget;
    determine a level of transparency of the call indicator tool based on determining whether or not the position of the call indicator tool is overlaying at least a portion of information being presented on the display, and (i) in response to determining the call indicator tool is overlaying at least a portion of information being presented on the display, decrease the level of transparency of the call indicator tool, or (ii) in response to determining the call indicator tool is not overlaying at least a portion of information being presented on the display, increase the level of transparency of the call indicator tool;
    receive an indication that the customer selected the at least one feature;
    in response to receiving the indication that the customer selected the at least one feature, alter the display to present information related to the selectable feature;
    receive a request from the customer to transmit the call indicator widget from the first video conference apparatus to a second video conference apparatus such that the second video conference apparatus is authorized to participate in the video conference communication session; and
    transfer the video conference communication session from the first video conference apparatus to the second video conference apparatus without disconnecting the video conference communication session based on at least receiving the request to transmit the call indicator widget to the second video conference apparatus.

2. The system of claim 1, wherein the call indicator tool is customized based on customer preferences such that the type of the at least one selectable feature is determined based on receiving customer preferences.

3. The system of claim 1, wherein the call indicator tool is configured to include a predetermined maximum number of selectable features, and wherein the executable instructions when executed further cause the processor to restrict the customer from adding a selectable feature to the call indicator tool based on determining the call indicator tool includes the maximum number of selectable features.

4. The system of claim 1, wherein the executable instructions when executed further cause the processor to dynamically position the call indicator tool, on the display, such that the call indicator tool may be repositioned into one or more non-fixed orientations throughout the video conference communication session.

5. The system of claim 1, wherein the executable instructions when executed further cause the processor to:
    determine the position of the call indicator tool, on the display, based on (i) determining the video conference communication session is utilizing a template for displaying information to the customer, and (ii) determining whether or not the position of the call indicator tool is overlaying at least a portion of the information, wherein the call indicator tool is presented in a position that does not overlay the at least portion information being displayed to the customer.

6. The system of claim 1, wherein the information presented on the at least one label for presenting information to the customer via the call indicator widget is non-static such that the information periodically changes based on the status of the video conference communication session.

7. The system of claim 1, wherein the display is configured to toggle between at least one of a document, web page, or video feed in response to receiving an indication that the customer selected the at least one feature.

8. The system of claim 1, wherein the at least one selectable feature comprises a view agent screen feature such that in response receiving an indication that the customer selected the view agent screen feature the executable instructions when executed further cause the processor to present a display of the business agent that is remotely located from the customer.

9. The system of claim 1, wherein the at least one selectable feature comprises a view agent text feature such that in response receiving an indication that the customer selected the view agent text feature the executable instructions when executed further cause the processor to present a real-time text feed of the business agent that is remotely located from the customer.

10. The system of claim 1, wherein the at least one selectable feature comprises a view documents feature such that in response receiving an indication that the customer selected the view documents feature the executable instructions when executed further cause the processor to present one or more documents related to the video conference communication session.

11. The system of claim 1, wherein the at least one selectable feature comprises an online banking feature such that in response receiving an indication that the customer selected the online banking feature the executable instructions when executed further cause the processor to present an online banking web page related to the video conference communication session.

12. The system of claim 1, wherein the at least one selectable feature comprises confirmation number feature such that in response receiving an indication that the customer selected the confirmation number feature the executable instructions when executed further cause the processor to present one or more confirmation numbers related to the video conference communication session.

13. A computer program product for providing a call indicator tool, the computer program product comprising:
 a non-transitory computer readable storage medium having computer readable program code embodied therewith, the computer readable program code comprising:
  a set of codes that when executed cause a computer to, transmit an indication that a customer requires communication with a business agent that is remotely located from the customer;
  a set of codes that when executed cause a computer to, initiate a video conference communication session between the customer and the business agent and a first video conference apparatus, wherein initiating the video conference session comprises providing a multimedia interface between the agent and the customer that provides the agent and the customer with an audio and video feedback of one another;
  a set of codes that when executed cause a computer to, in response to initiating the video conference communication session, initiate presentation on the display of a call indicator widget linked with the video conference communication session, wherein the call indicator widget includes (i) at least one selectable feature and (ii) at least one label for presenting information to the customer via the call indicator widget;
  a set of codes that when executed cause a computer to determine a level of transparency of the call indicator tool based on determining whether or not the position of the call indicator tool is overlaying at least a portion of information being presented on the display, and (i) in response to determining the call indicator tool is overlaying at least a portion of information being presented on the display, decrease the level of transparency of the call indicator tool, or (ii) in response to determining the call indicator tool is not overlaying at least a portion of information being presented on the display, increase the level of transparency of the call indicator tool;
  a set of codes that when executed cause a computer to, receive an indication that the customer selected the at least one feature;
  a set of codes that when executed cause a computer to, in response to receiving the indication that the customer selected the at least one feature, alter the display to present information related to the selectable feature;
  a set of codes that when executed cause a computer to receive a request from the customer to transmit the call indicator widget from the first video conference apparatus to a second video conference apparatus such that the second video conference apparatus is authorized to participate in the video conference communication session; and
  a set of codes that when executed cause a computer to transfer the video conference communication session from the first video conference apparatus to the second video conference apparatus without disconnecting the video conference communication session based on at least receiving the request to transmit the call indicator widget to the second video conference apparatus.

14. The computer program product of claim 13, wherein the at least one selectable feature comprises a view agent screen feature such that in response receiving an indication that the customer selected the view agent screen feature, the computer program product further comprises a set of codes that when executed cause a computer to present a display of the business agent that is remotely located from the customer.

15. The computer program product of claim 13, wherein the at least one selectable feature comprises a view agent text feature such that in response receiving an indication that the customer selected the view agent text feature the computer program product further comprises a set of codes that when executed cause a computer to present a real-time text feed of the business agent that is remotely located from the customer.

16. A computer-implemented method for providing a call indicator tool, the method comprising:
 transmitting, by a video conferencing module executed by a processor, an indication that a customer requires communication with a business agent that is remotely located from the customer;
 initiating, by a video conferencing module executed by a processor, a video conference communication session between the customer and the business agent and a first video conference apparatus, wherein initiating the video conference session comprises providing a multimedia interface between the agent and the customer that provides the agent and the customer with an audio and video feedback of one another;
 in response to initiating the video conference communication session, initiating, by a video conferencing module executed by a processor, presentation on the display of a call indicator widget linked with the video conference communication session, wherein the call indicator widget includes (i) at least one selectable feature and (ii) at least one label for presenting information to the customer via the call indicator widget;
 determining, by a video conferencing module executed by a processor, a level of transparency of the call indicator tool based on determining whether or not the position of the call indicator tool is overlaying at least a portion of information being presented on the display, and (i) in response to determining the call indicator tool is overlaying at least a portion of information being presented on the display, decrease the level of transparency of the call indicator tool, or (ii) in response to determining the call indicator tool is not overlaying at least a portion of information being presented on the display, increase the level of transparency of the call indicator tool;
 receiving, by a video conferencing module executed by a processor, an indication that the customer selected the at least one feature;
 in response to receiving the indication that the customer selected the at least one feature, altering, by a video conferencing module executed by a processor, the display to present information related to the selectable feature;
 receiving, by a video conferencing module executed by a processor, a request from the customer to transmit the call indicator widget from the first video conference apparatus to a second video conference apparatus such that the second video conference apparatus is authorized to participate in the video conference communication session; and
 transferring, by a video conferencing module executed by a processor, the video conference communication session from the first video conference apparatus to the second video conference apparatus without disconnecting the video conference communication session based on at least receiving the request to transmit the call indicator widget to the second video conference apparatus.

17. The computer-implemented method of claim 16, wherein the at least one selectable feature comprises a view agent screen feature such that in response receiving an indication that the customer selected the view agent screen feature, the method further comprises presenting a display of the business agent that is remotely located from the customer.

18. The computer-implemented method of claim 16, wherein the at least one selectable feature comprises a view agent text feature such that in response receiving an indication that the customer selected the view agent text feature the method further comprises presenting a real-time text feed of the business agent that is remotely located from the customer.

* * * * *